April 4, 1961  A. MOELLER  2,978,138
BAILER PLUG
Filed March 27, 1959  2 Sheets-Sheet 1
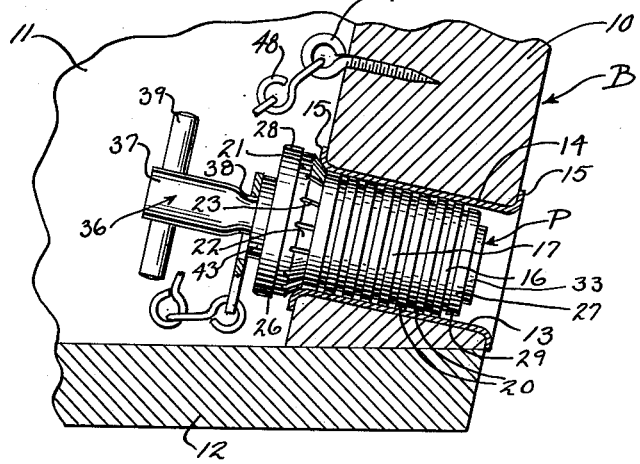
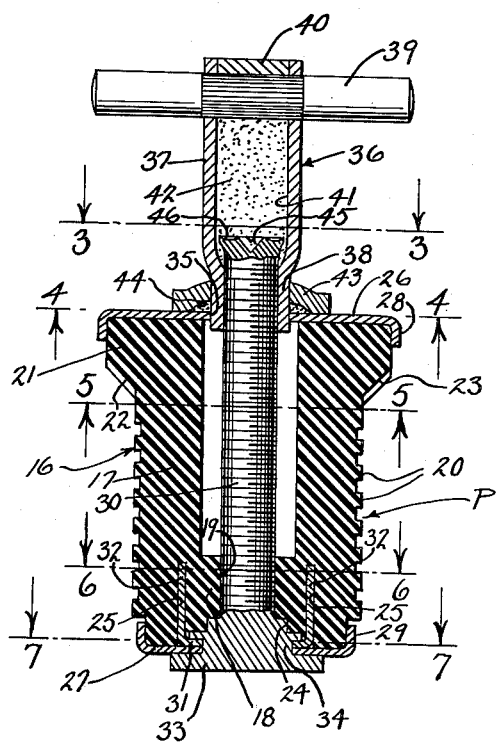
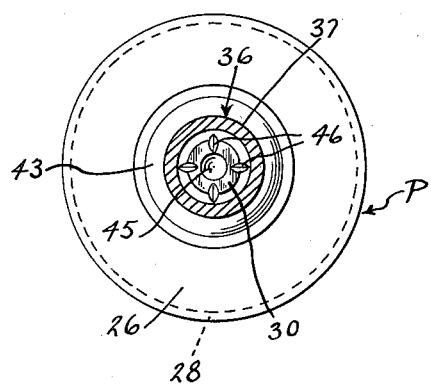
INVENTOR
AXEL MOELLER
BY
*Wright and Wright*
ATTORNEYS April 4, 1961

A. MOELLER 2,978,138

BAILER PLUG

Filed March 27, 1959

INVENTOR
AXEL MOELLER

BY
*Wright and Wright*

ATTORNEYS

United States Patent Office 2,978,138
Patented Apr. 4, 1961

2,978,138

BAILER PLUG

Axel Moeller, St. Petersburg Beach, Fla., assignor to Moeller Mfg. Co., Inc., Racine, Wis., a corporation of Wisconsin Filed Mar. 27, 1959, Ser. No. 802,522

2 Claims. (Cl. 220—24.5)

This invention appertains to expanding stoppers and plugs and more particularly to an improved removable plug for the drain openings in small boats and is companion to my application for patent Serial No. 733,933, filed May 8, 1958, entitled "Boat Drain Plug."

One of the primary objects of my present invention is to provide an improved drain plug of the expanding type having novel and simple means for preventing the minute leakage of water through the plug and for preventing the corrosion of certain parts of the plug by the action of salt water thereon by the use of a suitable grease packing around the threaded stem of the plug and other parts, whereby the active part of the stem will be lubricated and thus insure the easy turning of the reduced threaded nut section of the operating handle at all times on the stem.

Another salient object of my invention is to provide a novel operating handle embodying a tube having its inner end reduced in diameter and internally threaded to form a sleeve nut portion for adjustably receiving the threaded stem and its outer end closed by a sealing disc to form a packing chamber for grease between the sealing disc and the sleeve nut portion in which the stem rides during the adjustment of the handle on the stem, the sleeve nut portion also carrying a bearing washer for rotatably engaging the outer compression plate for the resilient stopper body, the bearing washer having an annular packing chamber for grease on its inner face for insuring the free turning of the bearing disc and handle on the outer compression plate during the adjustment of the handle on the threaded stem.

A further object of my invention is to provide novel means for treating the outer end of the stem to prevent accidental separation of the handle from the stem.

A further salient object of my invention is to provide a novel means for anchoring the resilient stopper body and the stem together, whereby to prevent independent movement of these parts relative to one another incident to the adjustment of the handle with its sleeve nut portion on the stem.

A further important object of the invention is to provide novel means for connecting the stem, the inner compression plate and anchor fingers or lugs for the stopper body together, so that these elements form a single component part of the plug, the stopper body having recesses for receiving the anchoring fingers or lugs.

A still further object of the invention is to provide novel means for forming the inner and outer compression plates, so that the same will partially encompass the ends of the stopper plug and thereby prevent deforming thereof during the adjustment of the plug, the inner compression plate preventing the stopper body from twisting off the anchoring fingers or lugs.

A still further important object of my invention is to provide novel means on the outer end of the stopper body for frictionally gripping the wall of the drain opening, so that turning of the stopper body in the drain opening will be prevented during the adjustment of the handle on the stem.

With these and other objects in view, the invention consists in the novel construction, arrangement and formation of parts, as will be hereinafter more specifically described and claimed, and illustrated in the accompanying drawings, in which drawings, Figure 1 is a fragmentary longitudinal sectional view through the stern of a boat showing my novel plug associated therewith;

Figure 2 is an enlarged longitudinal sectional view through the improved expanding plug;

Figure 3 is a transverse sectional view through the plug taken on the line 3—3 of Figure 2, looking in the direction of the arrows and illustrating more particularly the means for treating the inner end of the stem to prevent accidental separation of parts;

Figure 4:
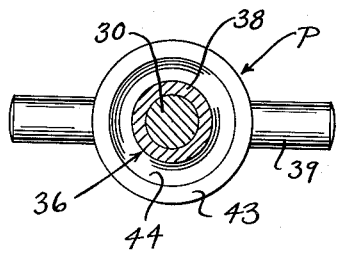
Figure 4 is a transverse sectional view through the plug taken on the line 4—4 of Figure 2, looking in the direction of the arrows, the view illustrating more particularly the annular packing chamber formed in the bearing washer.
Figure 5:
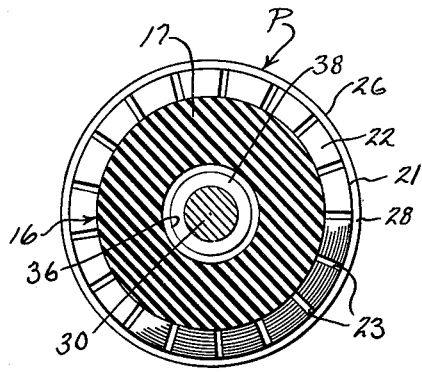
Figure 5 is a transverse sectional view taken on the line 5—5 of Figure 2, looking in the direction of the arrows, the view illustrating the formation of the outer end of the stopper body to prevent turning thereof in a drain opening.
Figure 6:
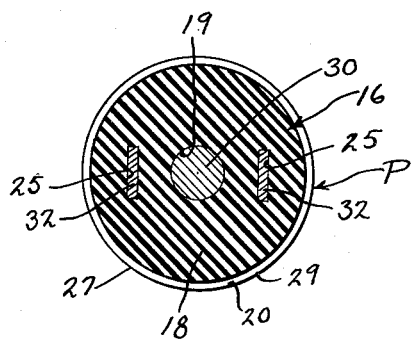
Figure 7:
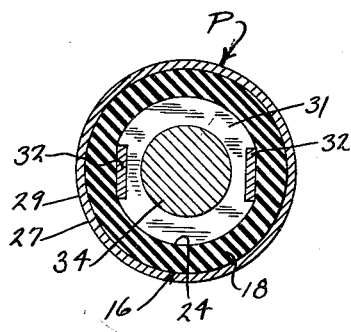

Figure 6 is a transverse sectional view taken on the line 6—6 of Figure 2, looking in the direction of the arrows, the view illustrating the means employed for anchoring the inner compression plate and stem to the stopper body, and Figure 7 is a transverse sectional view taken on the line 7—7 of Figure 2, looking in the direction of the arrows illustrating the anchor plate and the anchor fingers or lugs carried thereby.

Referring to the drawings in detail, wherein similar reference characters designate corresponding parts throughout the several views, the letter P generally indicates my improved baler or drain plug for a boat B.

The boat B forms no part of the present invention and can be of any desired type or character. As illustrated, the same includes a transom or stern board 10, side walls 11 and a bottom 12. The transom 10 has bored therein at an angle, adjacent to the bottom 12, a drain opening 13. The drain opening 13 has fitted therein a metal thimble or sleeve 14 and the opposite ends of the thimble or sleeve are upset, as at 15, against the opposite faces of the transom 10. The thimble or sleeve 14 is detachable so that swelling or contraction of the transom 10 will not alter the size or interior diameter of the drain openings. It is to be noted that the upsetting of the ends 15 of the sleeve 14 provides a slight flare at the ends of the thimble or sleeve 14.

My improved plug P includes a resilient compressible stopper body 16. This body includes an annular side wall 17 and a bottom wall 18. The bottom wall 18 is provided with an axial bore 19, the purpose of which will later appear. The outer surface of the side wall 17 is provided at equidistantly spaced points with resilient sealing ribs 20. The extreme outer end of the stopper body is provided with an annular skirt 21, the inner face 22 of which is tapered to correspond to a flaring upset end 15 of the thimble 14. This tapered face 22 is provided with spaced grooves 23 forming a threaded or friction surface for gripping the end of the thimble. The outer surface of the end wall 18 is recessed, as at 24, around the bore 19 for a purpose which will also later appear. Also formed in the end wall 18 are inwardly extending pockets 25 and the purpose of these pockets will also be later set forth.

The opposite ends of the resilient compressor stopper body 17 is confined between inner and outer compression plates 26 and 27.

The compression plates 26 and 27 have formed on their peripheries inwardly directed annular confining flanges 28 and 29, which are adapted to encompass the opposite ends of the stopper body 17. The inner compression plate 27 has rigidly secured thereto in a novel manner, a threaded stem 30 which extends through the bore 19 and entirely through the stopper body and out of the inner end of the stopper body. The stem 30 and the inner compression plate 27 carry means for anchoring the stopper body 17 thereto and this means includes a washer 31 having formed on its opposite sides inwardly extending fingers or lugs 32 which are fitted within the pockets 25 formed in the stopper body.

The novel means employed for connecting the stem 30, the compression plate 27 and the washer 31 together, includes a head or flange 33 formed on the inner end of the stem and the compression plate 27 and the washer 31 are slipped on the stem against this head or flange 33. At the point of the connection of the head or flange 33 with the stem a shank 34 of greater diameter than the head is provided and it is on this shank that the compression plate 27 and the washer 31 are slipped. The shank is now upset and flanged over the exposed face of the washer 31 and the washer 31 and the compression plate are firmly clamped between the head 33 and the flanged over portion of the shank. This is best shown in Figure 2.

As stated, the inner end of the stem 30 extends out of the inner end of the stopper body 17 and the inner compression plate 26 is provided with an axial opening 35 through which the stem extends.

An operating handle 36 is provided for bringing about the adjustment of the stopper body 17 and this handle 36 includes a tube 37 reduced in diameter at its inner end and internally threaded to provide a sleeve nut portion 38 for receiving the stem. A cross bar 39 is inserted through and secured to the outer end of the tube and forms a hand grip to facilitate the rotation of the handle. The extreme outer end of the tube is closed by a sealing disc 40 pressed into the tube. The tube between the sealing disc 40 and the reduced sleeve nut portion 38 provides an interior chamber 41 for receiving packing grease 42. Secured to the reduced sleeve nut portion 38, by a press fit or the like, is a bearing washer 43. The inner surface of the bearing washer has formed therein an annular recess 44 constituting a chamber for also receiving packing grease. The bearing washer 43 rotatably engages the outer surface of the inner compression plate 26.

At this time, it is to be noted that the extreme inner end of the stem is provided with an axially disposed recess 45. Prior to the placing of the handle bar 39 and the sealing disc 40 in place, the extreme inner end of the stem 30 is upset, as at 46, around the axial depression 45 and the upsetting of the stem at this point prevents the accidental removal of the handle 36 from the stem and this prevents separation and loss of parts. After the stem is upset, then the handle bar 39 and the sealing disc 40 are placed in position. It should also be noted that there is considerable space between the walls of the tube 37 and the threaded stem 30 and that there is also space between the upset portion 46 and the walls of the tube 37. Thus, the stem and upset end 46 can move freely in the lubricant or packing grease and the lubricant will at all times surround the stem to preserve the stem and lubricate the same.

In use of my improved plug, the handle 36 is threaded out on the stem, so that the stopper body 17 will not be compressed longitudinally. The plug is now inserted within the thimble 13 and is forcibly pressed against the outer end of the thimble so that the tapered threaded portion 22 of the stopper body will frictionally engage the thimble so that the tendency of the stopper body to turn in the thimble will be prevented. The handle 36 is now threaded inwardly on the stem 30 and this will bring about the drawing of the compression plates 26 and 27 toward one another and the compression of the stopper body longitudinally. The compression of the stopper body 17 longitudinally expands the body radially and into intimate gripping sealing contact with the thimble. This effectively seals the drain opening. Obviously, by turning the handle 36 in a reverse direction, the plug can be loosened and pulled out of the drain opening.

By providing a lubricant seal at the bearing washer 43 and a lubricant seal within the hollow handle any minute leakage of water through the stopper body will be prevented and the lubricant carried by the bearing washer 43 will prevent corrosion of the plug at this point and insure the free turning of the handle relative to the inner compression plate 26. As the inner end of the stopper operates within the lubricant filled chamber 41 stem 30 is automatically lubricated during the adjustment of the nut or handle 36 and corrosion will be prevented between the stem and the holder.

Great stress is laid on the confining flange 29 carried by the inner compression plate 27. This flange prevents deformation of the inner end of the stopper body 17 and the twisting off of the stopper body from the stem is eliminated.

In order to prevent loss of the plug from the boat, a screw eye 47 can be threaded into the transom and the screw eye can be connected to the stopper by a chain 48 or the like.

From the foregoing description, it can be seen that I have provided an exceptionally efficient form of expanding plug for the drain openings of small boats.

Changes in details may be made without departing from the spirit or the scope of this invention, but what I claim as new is:

1. A bailer plug comprising a cylindrical resilient compressible body, inner and outer compression plates engaging the opposite ends of the body, an axially disposed threaded stem rigidly carried by the inner compression plate extending through the body and out of said outer compression plate, a sleeve nut threaded on the outer end of said stem having means engaging the outer face of the outer compression plate, an operating handle including a tube having its inner end reduced in diameter and internally threaded and receiving said stem, the outer end of said tube being sealed, the portion of the tube between the seal and the reduced end constituting a chamber in which the inner end of the stem travels, a lubricant packed in said chamber, said stem being of a size and configuration so that at all times it is spaced from said chamber walls for the free movement of lubricant in and about said chamber and stem whereby upon adjustment of the sleeve nut in one direction the body will be compressed between the inner and outer plates and expanded radially, said body having a radially projecting annular skirt on its outer end, said skirt being tapered inwardly for engagement with the wall of an opening, said tapered portion having grooves to form an anti-friction face for gripping contact with the wall of an opening, the inner end of said body having pockets, fingers rigidly carried by the inner compression plate and stem seated in said pockets to prevent turning movement of the body and inner compression plate relative to one another, and an annular inturned flange on the inner compression plate encompassing the inner end of the body to prevent deformation thereof incident to the compression of the body.

2. A bailer plug comprising a resilient compressible body, inner and outer compression plates engaging the opposite ends of said body, an axially disposed threaded stem rigidly carried by the inner compression plate extending through the body and said outer compression plate, and an operating handle including a tube having its inner end reduced in diameter and internally threaded and receiving said stem, the outer end of said tube being sealed, the portion of the tube between the seal and the reduced end constituting a chamber in which the inner end of the stem travels, and a lubricant packed in said chamber, said stem being of a size and configuration to at all times be spaced from said chamber walls for the free movement of lubricant in and about said chamber and stem and means carried by the reduced portion of the stem engaging the outer surface of the outer compression plate, said means also having its inner face provided with an annular chamber and packing grease in said chamber, whereby upon adjustment of the sleeve nut in one direction the body will be compressed between said plates and expanded radially and whereby the stem and other parts will be sealed and lubricated to prevent corrosion.

References Cited in the file of this patent

UNITED STATES PATENTS

| | | |
|---|---|---|
| 2,644,610 | Work | July 7, 1953 |
| 2,773,619 | Moeller | Dec. 11, 1956 |
| 2,831,619 | Cowie | Apr. 22, 1958 |